United States Patent [19]
Head, Jr. et al.

[11] Patent Number: 5,595,131
[45] Date of Patent: Jan. 21, 1997

[54] FLEXIBLE AND RESILIENT SUPPORTS FOR A GRAIN BOX

[75] Inventors: Glenn D. Head, Jr., Des Moines, Iowa; Mark Johnston, Lockport, Ill.

[73] Assignee: Deere & Company, Moline, Ill.

[21] Appl. No.: 540,380

[22] Filed: Oct. 10, 1995

[51] Int. Cl.⁶ .................................................. A01B 59/043
[52] U.S. Cl. ........................ 111/200; 111/900; 280/461.1
[58] Field of Search ..................................... 111/200, 900, 111/901, 903, 906; 248/581, 601, 624; 403/223, 225, 228; 280/474, 415 R, 461 A, 411 A, 446 A

[56] References Cited

U.S. PATENT DOCUMENTS

| | | | |
|---|---|---|---|
| 3,026,829 | 3/1962 | Lampkin | 111/200 |
| 3,391,663 | 7/1968 | Cagle et al. | 111/200 |
| 4,518,046 | 5/1985 | Rettig et al. | 172/311 |
| 4,609,203 | 9/1986 | Steilen et al. | 280/461 A |
| 4,667,943 | 5/1987 | Izumi et al. | 403/228 X |
| 5,324,174 | 6/1994 | Diotte | 248/607 X |
| 5,409,192 | 4/1995 | Oliver | 248/581 X |

OTHER PUBLICATIONS

John Deere Drills Brochure entitled "Accurate Drills for Every Situation from Clean–Till to No–Till", pp. 16–17, and 21, DKA141 (94–03), printed in the U.S. (no date).

*Primary Examiner*—Terry Lee Melius
*Assistant Examiner*—Robert Pezzuto

[57] ABSTRACT

The present invention is directed to a flexible and resilient intermediate support member for supporting the grain box of a grain drill. The intermediate support member comprises a vertical frame member rigidly secured to the grain box and a horizontal frame member rigidly mounted to a transverse support frame. A guide pin projects upwardly through the horizontal frame member and engages the bottom of the vertical frame member. The guide pin is formed by a bolt and a spacer, that are slidably mounted to the horizontal frame member. An engagement nut is mounted to the threaded end of the bolt engages the bottom portion of the vertical frame member. A bearing washer is located between the engagement nut and the spacer. A spring is positioned between the bearing washer and the horizontal frame member. A trapping washer located between the head of the bolt and the spacer is used to trap the guide pin to the horizontal frame member.

10 Claims, 2 Drawing Sheets

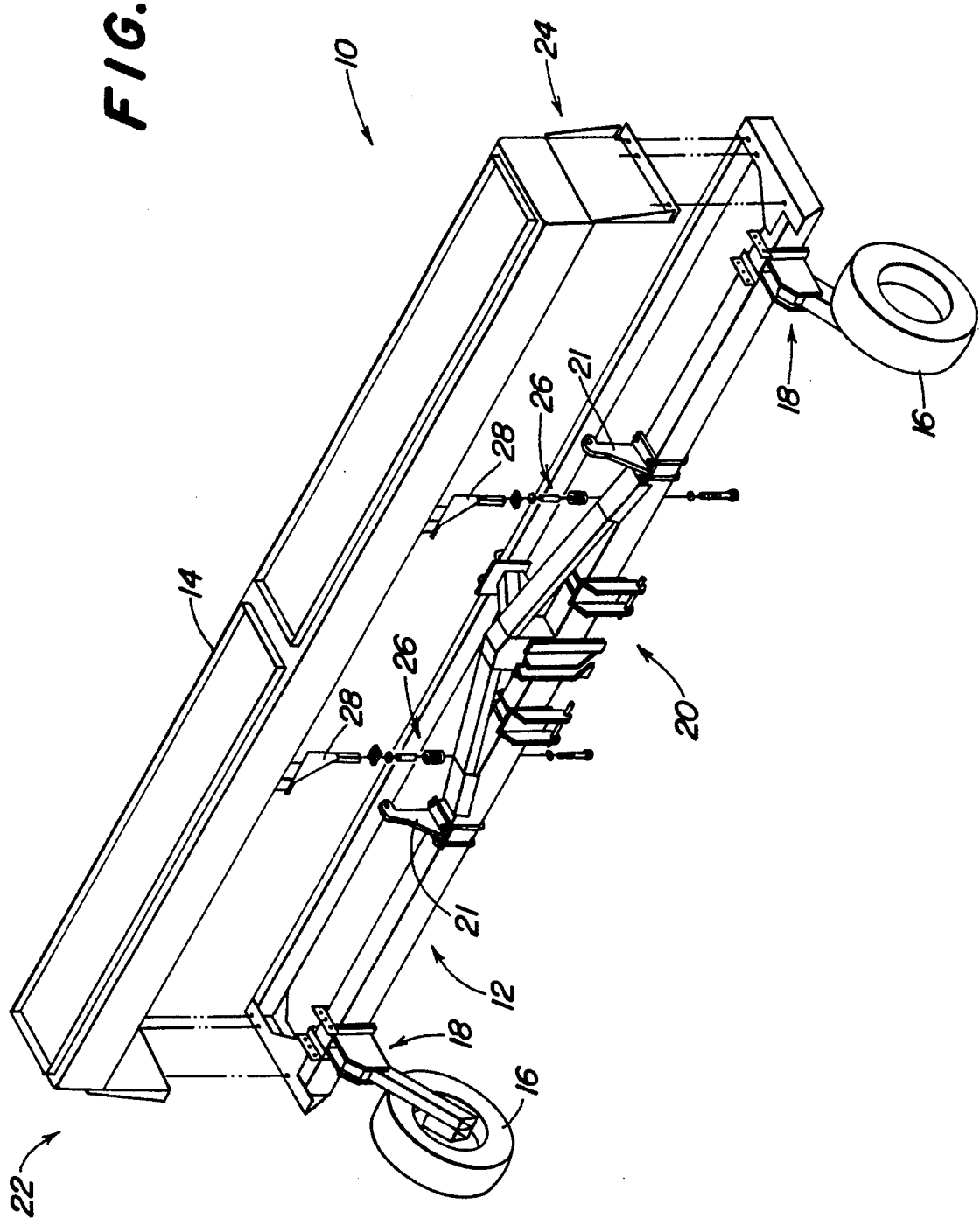

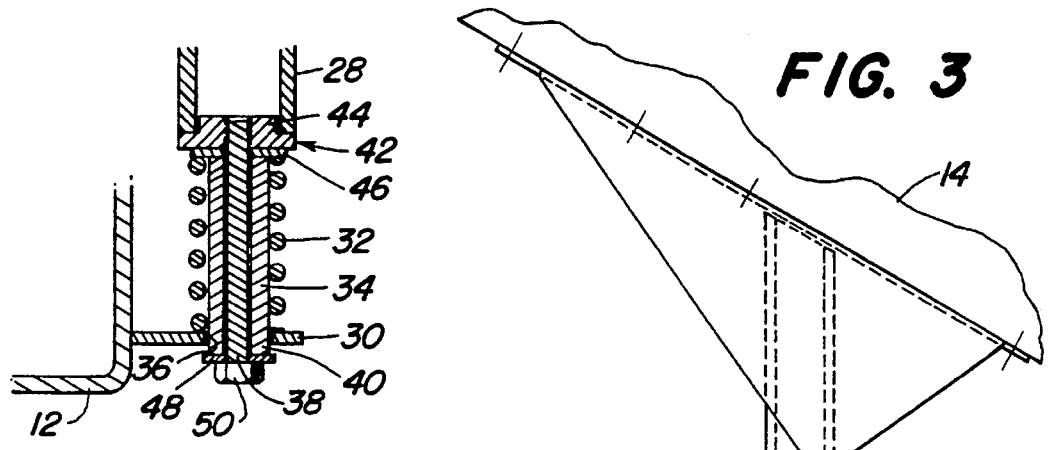
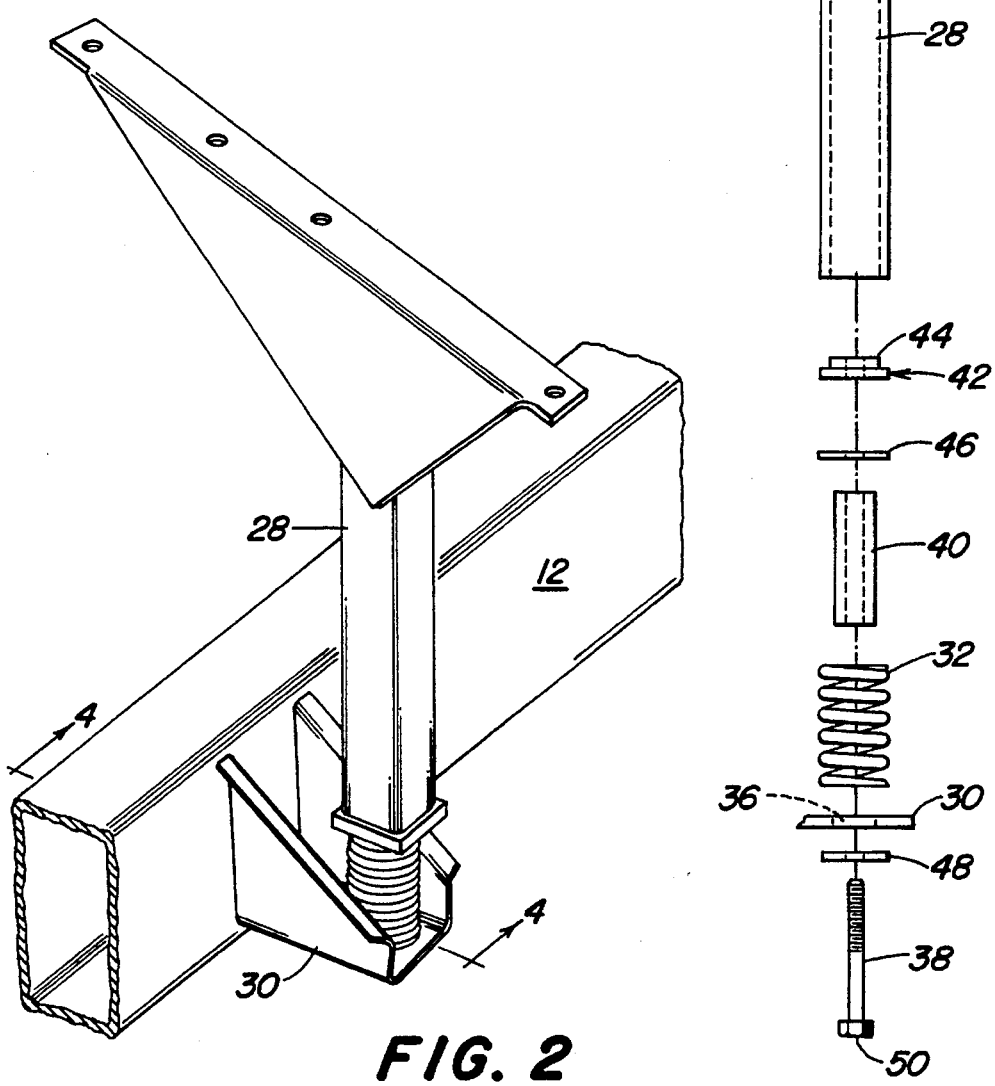

1

FLEXIBLE AND RESILIENT SUPPORTS FOR A GRAIN BOX

BACKGROUND OF THE INVENTION

1. Field of the Invention

The invention is directed to providing a grain box having a rigid unitary structure with vertically flexible and resilient intermediate supports.

2. Background of the Invention

Grain drills are used for sowing seeds in narrow rows. Each row of the drill is provided with a furrow opener and seed meter. The seed meters receive seed from a grain box or boxes. The drill is towed through the field by a tractor. The supporting frame maybe provided with means for receiving a three-point hitch or a drawbar hitch.

The grain box is mounted to a transverse support frame. Very wide drills maybe provided with a one or more grain boxes. For long grain boxes a flexible joint is formed between two box segments. This flexible joint allows for movement between the grain box and the supporting frame as the supporting frame flexes during field operations.

SUMMARY

It is an object of the present invention to provide a flexible vertical support mechanism for grain boxes that can be used on very wide grain drills so that the grain box maybe a rigid unitary structure.

Other objects include eliminating the flexible joint needed in very long grain boxes, reducing loads on grain boxes, and reducing the number of pads in long grain boxes.

The invention comprises a vertical frame member that is mounted to the grain box and a horizontal frame member that is mounted to the support frame. A spring is located between the two framer members by a guide pin. The guide pin is formed by a bolt and a spacer around which the spring is positioned. The bolt and spacer extend upwardly through the horizontal frame member. An engaging nut is mounted to the threaded end of the bolt and is provided with a rectangular raised engagement surface which engages a rectangular opening in the vertical frame member. The engaging nut is provided with a bearing washer and the head of the bolt is provided with a trapping washer. The spring is located between the bearing washer and the horizontal frame member. The trapping washer traps the guide pin to the horizontal frame member.

BRIEF DESCRIPTION OF THE DRAWINGS

FIG. 1 is an exploded view of a transverse support frame and grain box of a grain drill.

FIG. 2 is a perspective view of the intermediate support member.

FIG. 3 is an exploded view of the intermediate support member.

FIG. 4 is a partial cross sectional view of the intermediate support member.

DETAILED DESCRIPTION

FIG. 1 discloses a grain drill 10 having a transverse support frame 12 and an elongated grain box 14, The transverse support frame is provided with two support wheels 16 which are mounted to the frame by wheel support members 18. The center of the frame located between the two support wheels is provided with an assembly 20 for receiving a three-point hitch. The assembly 20 forms a means for releasably coupling the grain drill to a tractor. It should be noted that a drawbar hitch or other suitable hitch assembly may be substituted for the drawbar hitch. In addition, the transverse support frame 12 is provided with two rockshaft cylinder supports 21.

The elongated grain box 14 is of a rigid unitary structure and is not provided with a flexible joint. It is rigidly coupled to the transverse support frame at its first and second ends 22 and 24 by suitable bolts.

Located between the first and second ends are two intermediate support members 26. Each support member comprises a vertical frame member 28 that is rigidly secured to the grain box, and a horizontal frame member 30 which is rigidly secured to the transverse support frame 12. These support members are flexible and resilient in the vertical direction.

This is accomplished by a spring 32 which is held in place by a guide pin 34 which passes through an aperture 36 formed in the horizontal frame member 30. The guide pin comprises a bolt 38 and a spacer 40 that are slidably mounted to the horizontal frame member 30. An engagement nut 42 having a raised rectangular engagement surface 44 is threaded on bolt 38 and engages the rectangular open end of vertical frame member 28. As shown in FIG. 4, the rectangular engagement surface engages the internal rectangular opening formed by the rectangular tubing of vertical frame member 28. A bearing washer 46 is positioned between the engagement nut 42 and the spacer 40. The spring 32 is located around the guide pin 34 between the bearing washer 46 and the upper surface of the horizontal frame member 30. The guide pin is trapped in place by a trapping washer 48 which is located between the head 50 of the bolt 38 and the spacer 40. The outer diameter of trapping washer 48 is greater than the inner diameter of aperture 36 thereby trapping the guide pin to the horizontal frame member 30.

The present invention should not be limited to the above described embodiment, but should be limited solely to the claims that follow.

We claim:

1. A grain drill for sowing seeds in a field, the grain drill comprising:

a transverse support frame;

an elongated grain box for holding seed of a rigid unitary structure being provided with a first end and a second end opposite the first end, the first and second ends of the grain box are rigidly mounted to the transverse support frame;

an intermediate support being mounted to the transverse support frame and vertically supporting the grain box between the first and second ends of the grain box, the intermediate support being vertically resilient and flexible.

2. A grain drill as defined by claim 1 wherein the intermediate support comprises a vertical frame member that is mounted to the grain box and extends downwardly from the box towards a horizontal frame member, the horizontal frame member being mounted to the transverse support frame, a spring being positioned between the vertical frame member and the horizontal frame member.

3. A grain drill as defined by claim 2 wherein the intermediate support further comprises a guide pin slidably mounted to the horizontal frame member, the spring surrounds the guide pin.

4. A grain drill as defined by claim 3 wherein the guide pin comprises a bolt and surrounding spacer, the bolt extends upwardly through the horizontal frame member towards the vertical frame member, an engaging nut being screwed onto the bolt and having an engagement surface that engages the vertical frame member.

5. A grain drill as defined by claim 4 wherein the spring extends between the engaging nut and the horizontal frame member.

6. A grain drill as defined by claim 5 wherein the bolt is provided with a head and a trapping washer is positioned on the bolt between the head and the spacer for trapping the guide pin to the horizontal frame member.

7. A grain drill as defined by claim 6 wherein a bearing washer is positioned between the engaging nut and the spacer, the spring bearing against the bearing washer and the horizontal frame member for biassing the guide pin upwardly from the horizontal frame member into engagement with the vertical frame member.

8. A grain drill as defined by claim 7 wherein the said grain drill is provided with two intermediate supports.

9. A grain drill as defined by claim 8 wherein the transverse support frame is provided with a means for releasably coupling the grain drill to a tractor.

10. A grain drill as defined by claim 9 wherein the engagement surface being raised and rectangular and fitting into a rectangular opening formed in the vertical frame member.

* * * * *